US012328544B2

(12) United States Patent
Kucharko

(10) Patent No.: US 12,328,544 B2
(45) Date of Patent: Jun. 10, 2025

(54) ADAPTER FOR AN EARPHONE

(71) Applicant: FIRST WEST GMBH, Vienna (AT)

(72) Inventor: Jerzy Franciszek Kucharko, Vienna (AT)

(73) Assignee: FIRST WEST GMBH, Vienna (AT)

( * ) Notice: Subject to any disclaimer, the term of this patent is extended or adjusted under 35 U.S.C. 154(b) by 220 days.

(21) Appl. No.: 18/014,028

(22) PCT Filed: Jun. 30, 2021

(86) PCT No.: PCT/AT2021/000013

§ 371 (c)(1),
(2) Date: Dec. 30, 2022

(87) PCT Pub. No.: WO2022/000003

PCT Pub. Date: Jan. 6, 2022

(65) Prior Publication Data

US 2023/0292033 A1 Sep. 14, 2023

(30) Foreign Application Priority Data

Jul. 3, 2020 (AT) .................................. 60214/2020

(51) Int. Cl.
*H04R 1/10* (2006.01)

(52) U.S. Cl.
CPC ........... *H04R 1/105* (2013.01); *H04R 1/1016* (2013.01); *H04R 1/1066* (2013.01)

(58) Field of Classification Search
CPC .... H04R 1/105; H04R 1/1016; H04R 1/1066; H04R 25/652; H04R 2201/109
See application file for complete search history.

(56) References Cited

U.S. PATENT DOCUMENTS 4,965,838 A 10/1990 Kamon et al.
6,688,421 B2 * 2/2004 Dyer .................... H04R 25/652 381/328
11,750,961 B2 * 9/2023 Kirkpatrick .......... H04R 1/1016 381/380

(Continued)

FOREIGN PATENT DOCUMENTS

CN 206922980 U 1/2018
EP 1355508 B1 11/2011

(Continued)

OTHER PUBLICATIONS

International Search Report for PCT/AT2021/000013, prepared by the European Patent Office, mailing date Nov. 5, 2021, 7 pages including English Translation.

(Continued)

*Primary Examiner* — Angelica M McKinney
(74) *Attorney, Agent, or Firm* — Brooks Kushman P.C.

(57) ABSTRACT

An adapter, which can be releasably connected to an earphone and assists in the fastening of the earphone to a human ear, without impairing the sound output of the earphone. In order to fasten the adapter to the earphone, a shell-type part of the adapter encompasses a volume region of the earphone, the shell-type part being in planar contact with the earphone under pressure, the compressive force being caused predominantly by elastic bending deformation of the shell-type part as a result of the contact with the earphone.

12 Claims, 5 Drawing Sheets

(56) References Cited

U.S. PATENT DOCUMENTS

| | | | | |
|---|---|---|---|---|
| 2005/0147269 | A1 | 7/2005 | Oliveira et al. | |
| 2014/0119589 | A1* | 5/2014 | Wyzisk | H04R 1/105 381/380 |
| 2018/0310089 | A1* | 10/2018 | Yun | H04R 1/105 |
| 2019/0069063 | A1* | 2/2019 | Kirkpatrick | H04R 1/1016 |
| 2019/0261079 | A1* | 8/2019 | Okawa | H04R 1/1016 |

FOREIGN PATENT DOCUMENTS

| | | | |
|---|---|---|---|
| EP | 2566187 | A2 | 3/2013 |
| GB | 2220819 | A | 1/1990 |

OTHER PUBLICATIONS

Anonymous. "Amazon.com: Decibullz Custom Moldable Covers and Ear Hooks. Universal Earbuds Accessory, Compatible with Apple AirPods(r) and EarPods: Electronics" Oct. 30, 2019, Retrieved from the Internet: https://www.amazon.com/Decibullz-Custom-Molded-Airpods-Covers-Compatible/dp/B07ZS511QT [retrieved on Oct. 27, 2021] XP055855433.

Anonymous. "Userguide for Decibullz Custom Moldable Airpods Adapters" Oct. 30, 2019, Retrieved from the Internet: https://m.media-amazon.com/images/I/A1VvwRzsYiL.pdf [retrieved on Oct. 27, 2021] XP055855445.

* cited by examiner

ADAPTER FOR AN EARPHONE

CROSS-REFERENCE TO RELATED APPLICATION

This application is the U.S. national phase of PCT Application No. PCT/AT2021/000013 filed on Jun. 30, 2021, which claims priority to AT Patent Application No. A 60214/2020 filed on Jul. 3, 2020, the disclosures of which are incorporated in their entirety by reference herein.

The invention relates to an adapter for an earphone, and to a combination of an earphone and an adapter.

An earphone within the meaning of this document is an electrically operated device which is intended to be fastened directly to the outer part of the human ear in such a way that it at least projects into the auricle, and which can, in a controlled manner, generate sound that is intended to be heard clearly by way of the ear to which the device is fastened. An earphone is typically connected either by cable or by radio (that is to say wirelessly) to a further device such as a telephone or a device for playing music, and it receives from said device the information to be acoustically reproduced. A device comprising an earphone can for example also be a hearing device, that is to say a hearing aid, which serves to compensate for a hearing impairment of an ear by amplifying presently incoming sounds from the environment in relevant frequency ranges directly at the auditory canal. An earphone, however, can also for example be part of a so-called headset, that is to say a device which, in addition to a loudspeaker, also contains a microphone and exchanges information signifying sound in the form of electromagnetic signals by cable or wirelessly with a device arranged at a distance.

Essential functional aspects of devices that comprise an earphone concern the fastening thereof to the human ear. In this regard, relevant prior art shall be set out here:

EP 1 355 508 B1 presents an earphone and an adapter fastened thereto, which has a narrow channel by way of which the propagation of sound away from the earphone is intended to be confined exclusively to the external auditory canal 1 from the earphone. The adapter consists of a rubber-elastic material. It is fastened to the earphone by being fitted over the latter, wherein it is stretched elastically. As a consequence of the elastic stretching around the earphone, the adapter abuts under pressure against the earphone and is held against relative displacement with respect to the earphone by frictional engagement. Optionally, the adapter has a protruding extension which, if used, projects to a region of the auricle and improves the holding action at the ear. The holding action of the adapter at the earphone by way of elastic stretching is a disadvantage since it does not force an exact fitting, and since, as a result of the rather undefined additional elastic deformation of the adapter material with the attachment and detachment of the adapter, the material of the adapter quickly suffers fatigue, expands and tears. Moreover, especially exact attachment of the adapter to the earphone requires a disturbingly large amount of skill, time and attention.

EP 2 566 187 A2 presents an adapter for an earphone, wherein the adapter has an extension which, when used as intended, projects to a point of the auricle which is situated at a distance from the entry to the auditory canal and is in abutment there, so that the anchoring at the auricle is improved. The adapter has a shell-like region which, with slight elastic bending, is able to be placed over a region of the earphone and which, by means of two latching projections, is able to be latched into place at complementary latching-in depressions at the earphone. Form-fitting holding of the adapter on the earphone that is defined in all six degrees of freedom of the conceivable relative movements between earphone and adapter is thus able to be achieved. What is disadvantageous is that separate depressions are required at the earphone and that, with attachment and detachment, heavy wear occurs quickly as a consequence of the combination of high surface pressure and friction.

The documents US 2018310089 A1, US 2014119589 A1 and US 2019261079 A1 show in each case for an earphone an adapter which, like the adapter according to EP 2 566 187 A2, has an extension which, when used as intended, projects to a point of the auricle and is in abutment there. As in the case of the adapter according to EP 1 355 508 B1, the adapter consists in this case of rubber-elastic material which, in a mounted state, is tensioned around the earphone and in the process deformed predominantly by elastic stretching.

CN 206922980 U, too, presents an adapter for an earphone for better fixing to the auricle. The adapter is fastened to the earphone so as to be pivotable about an axis, for which purpose two extensions, curved in the shape of part of a circle, of the adapter embrace a waisted region of the earphone with a clearance fit. The two extensions are elastically bent only during the attachment and detachment of the adapter with respect to the earphone.

U.S. Pat. No. 4,965,838 presents a ring-like embracing means for the circular-surface-shaped sound-emission surface of an earphone, which embracing means serves for focussing the propagation of sound. The embracing means has multiple tongues which are bent in a hook-like manner and on which the earphone, when mounted on the adapter, has to be forced through a ring-like connecting region between the tongues, so that the earphone first reaches the feet of the tongues and, only then, their tips; with the dismounting, the sequence of events is reversed. The ring-like connecting region has to be stretched elastically during mounting and dismounting. This results in relatively difficult mounting processes and premature failure of the adapter.

US 2005147269 A1 presents an earphone and an adapter fastened thereto, which has a narrow channel by way of which the propagation of sound away from the earphone is intended to be confined exclusively to the external auditory canal 1 from the earphone. The adapter has a series, closed in a ring-like manner, of short, wide projections which together, in a mounted state, embrace a region of the earphone and abut, under elastic bending pretension, against the embraced region of the earphone. The projections are curved toward the embraced region and abut against the earphone maximally with linear contact. The linear contact results in very high surface pressure at the surface of contact of the earphone and thus quickly in visible signs of wear and damage.

GB 2220819 A presents an earphone and an adapter fastened thereto. In a state fastened to one another, a circular-disk-shaped region of the earphone is embraced by a ring-like region of the adapter, wherein the adapter, with short elastically bent spring tongues, is in punctiform abutment in a groove in the earphone that is provided separately for this purpose. High surface pressure at the points of contact results, with fastening and with detachment, promptly in damage to the two components, so that the design is suitable for repeated fastening and detachment of earphone and adapter with respect one another only to a very limited extent.

The object on which the invention is based is that of providing, for an earphone, an adapter which is detachably connectable to the earphone and which assists with fixing of the earphone to the ear. Compared to already known adapters, the new adapter is intended to be better to the extent that it has the entire combination of the following advantages:

The propagation of sound away from the earphone is not (appreciably) influenced by the adapter.

The adapter can be mounted on the earphone by a simple movement and, in the process, passes simply into a precisely defined relative position with respect to the earphone and then remains therein.

The adapter is able to be detached from the earphone by a simple movement.

It is not necessary for there to be provided on the earphone any special geometry by which the holding of the adapter is intended to be improved. (That is to say: A latching trough, latching projections, halves of plug-in connections, etc. are not required at the earphone.)

Many cycles of attachment and detachment do not give rise to any damage at either the adapter or at the earphone.

To achieve the object, use is made of an adapter design which has the following properties (known from EP 2 566 187 A2):

The adapter has a shell-like part which, in a mounted state, regionally embraces the surface of the earphone in such a way that the earphone is consequently held in a form-fitting manner on the adapter and relative movement of the two of them with respect one another is prevented in a form-fitting manner in all six degrees of freedom.

There are multiple contact-surface regions between adapter and earphone, at which these abut against one another under mutual pressure, wherein the pressure force is a consequence of elastic deformation of the adapter due to the abutment against the earphone.

No part of the adapter projects into that volume region outside the earphone from which connecting lines to the sound-emission surface of the earphone that extend in the air and rectilinearly and meet the sound-emission surface at a right angle are conceivable.

In order for the adapter to fulfill the purpose of holding the earphone on the ear in a improved way, it has a support extension and/or, at those surface regions which, when used as intended, abut against the human ear, it is formed from a material which has a higher coefficient of friction with respect to human skin—typically silicone.

Possibly, the support extension, when arranged mounted on the ear, extends between the vicinity of the earphone and a region of the concave side of the auricle, which region is spaced apart from the external auditory canal of the ear, and there is under pressure as a consequence of elastic deformation.

As further development thereof according to the invention, the following additional features are proposed:

a The shell-like part of the adapter comprises at least two extensions—furthermore referred to as "holding extensions"—and a common connecting region of the holding extensions, wherein the holding extensions protrude from the connecting region in the manner of peninsulas and, in a mounted state, abut areally against the earphone.

b In a mounted state, the holding extensions and their connecting region clasp a volume region of the earphone from different sides, and in the process are preloaded, predominantly by bending stress, elastically in the direction away from the center of the clasped volume region in relation to the orientation in an elastically relaxed state.

c For attachment and detachment of the adapter, the holding extensions, due to the abutment against the volume region to be clasped, are temporarily bent elastically with greater intensity in the direction away from the center of the clasped volume region.

The invention, including advantageous additional features, will be illustrated and discussed in more detail on the basis of drawings of exemplary embodiments:

Parts with a similar function are denoted in each case by the same item number in the different examples.

Figure 1:
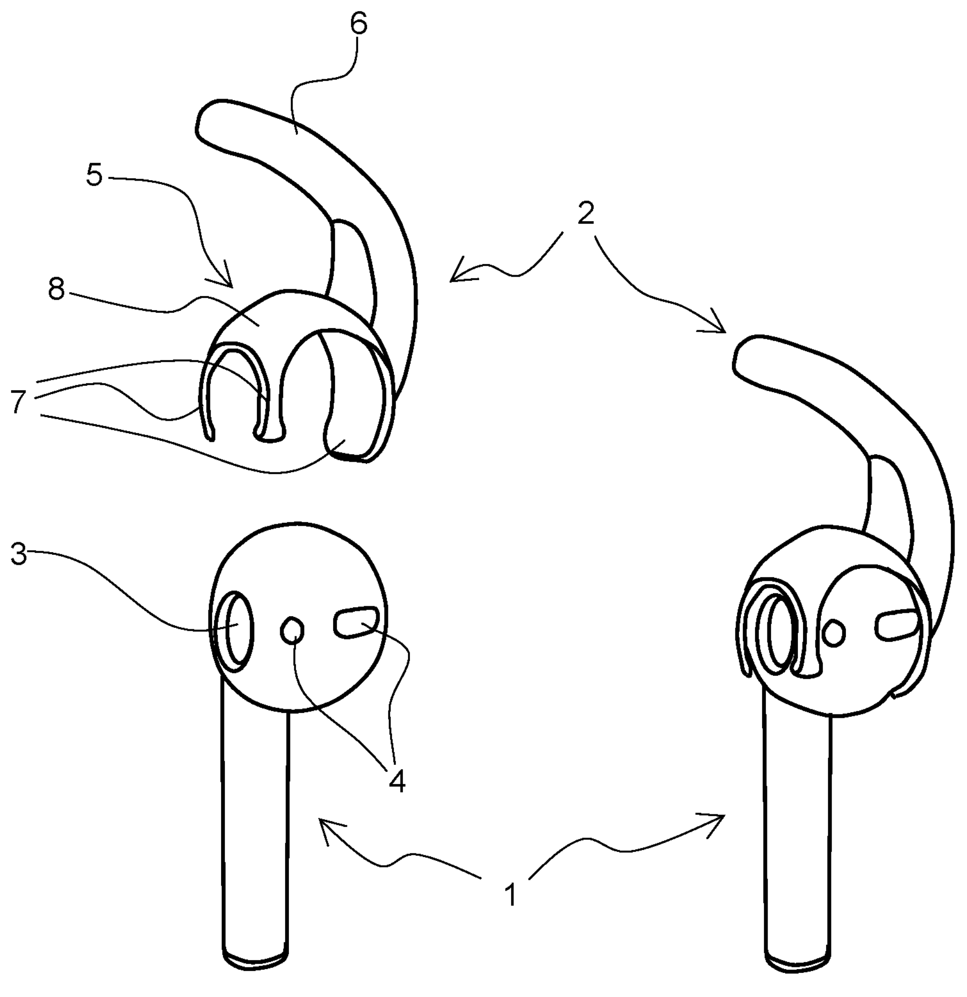
FIG. 1 shows, in the left-hand part, a first combination according to the invention of an earphone and an adapter according to the invention in a state detached from one another and, in the right-hand part, said combination in an assembled state.
Figure 2:
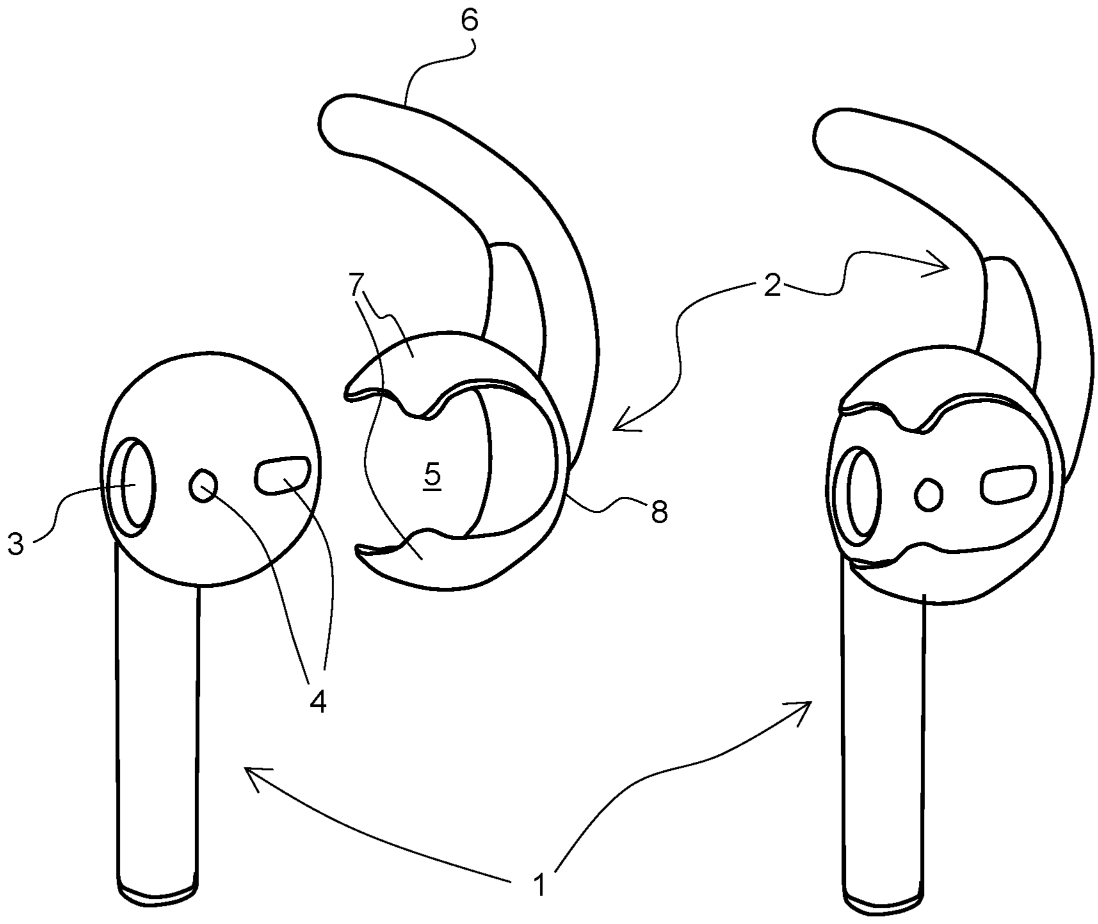
FIG. 2 shows, in the left-hand part, a second combination according to the invention of an earphone and an adapter according to the invention in a state detached from one another and, in the right-hand part, said combination in an assembled state.
Figure 3:
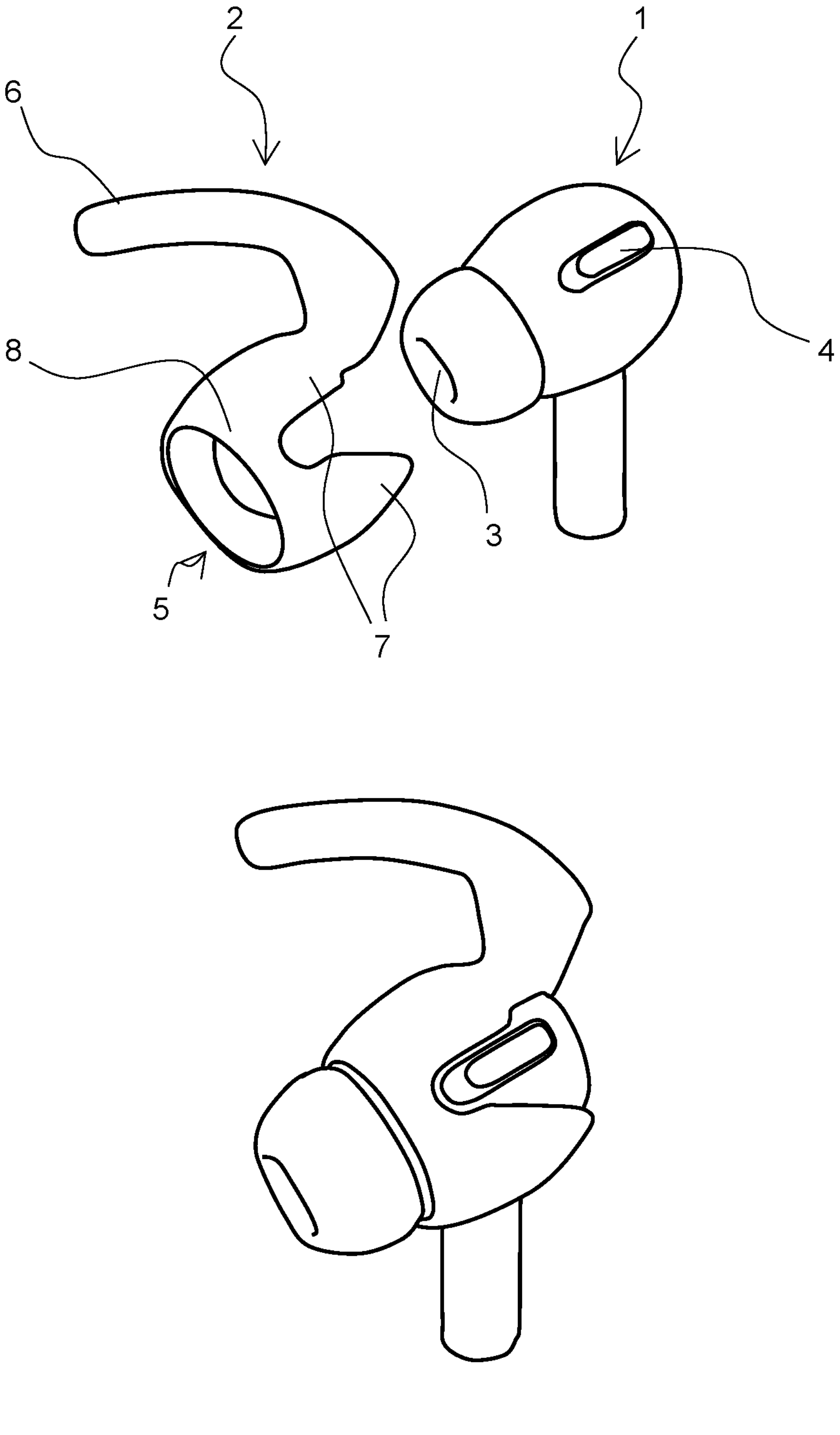
FIG. 3 shows, in the upper part, a third combination according to the invention of an earphone and an adapter according to the invention in a state detached from one another and, in the lower part, said combination in an assembled state.

The depicted combinations according to the invention as per FIG. 1 consist in each case of an earphone 1 and an adapter 2. The earphone 1 has a sound-emission surface 3 and multiple sensor surfaces 4.

The adapter 2 has a shell-like part 5, from the outer side of which a support extension 6 protrudes. The shell-like part 5 comprises multiple holding extensions 7 and a connecting region 8 which connects said holding extensions, wherein the transition between holding extensions 7 and connecting region 8 is typically smooth.

In a mounted state, the shell-like part 5 of the adapter 2 embraces a volume region of the earphone 1 from different sides such that the earphone 1 is thus held in a form-fitting manner. Here, the holding extensions 7 abut areally against the earphone 1, specifically against surfaces which are domed convexly outward. Here, the shell-like part 5 is not elastically relaxed, but rather, in relation to its relaxed position, slightly bent, specifically such that the holding arms, in relation to the position with the shell-like part 5 relaxed, are pushed slightly further away from the center of the embraced volume. This means that the abutment against the earphone 1 results in the holding extensions 7 being bent away slightly in the direction from the embraced region. As a result of the elastic restoring force that is thus induced, the holding extensions 7 abut under pressure—and thus free of play—against the earphone 1 in a precisely predefined position. Relative movement between earphone 1 and adapter 2 from said predefined position leads over a first region to an increasing elastic deformation of the shell-like part 5 and thus to a restoring force, by way of which, in the absence of other effects, the earphone 1 and the adapter 2 slide relative to one another back into the predefined ideal position with respect to one another again.

Ideally, the holding extensions 7 are shaped in such a way that, when, in a mounted state, they abut against the earphone 1 and are bent slightly upward by the latter, they abut tightly against the earphone 1. This means that it is then the case that at least a large part of their surface facing toward the earphone 1 has the same shape and dimensions as that surface region of the earphone 1 which faces toward them. As a result of the abutment "over a large area" of the holding extensions 7 against the adapter 2 that is thus achieved, the surface pressure—that is to say the force per unit area—on the surface of contact between holding extensions 7 and surface of the adapter 2 is relatively low. There is consequently no risk of damage. As a result of the large surface of contact, there is however advantageously a large amount of static friction present.

For mounting the adapter 2 on the earphone 1, the two of them are moved toward one another in such a way that those ends of the holding extensions which are situated facing away from the connecting region 8 firstly meet the volume region to be embraced of the earphone 1, then slide on the surface of said region, are slightly spread apart in the process, and finally close over said region again, to such an extent that they abut tightly against the surface of the region to be embraced of the adapter 2.

The fact that the holding extensions 7 abut against convex—that is to say outwardly domed—surface regions of the adapter 1, means that it is easily able to be achieved that, with the relative movement between adapter 2 and earphone 1 that is required for connection and detachment of the adapter 2 with respect to the earphone 1, said holding extensions have to be bent out of their relaxed position only slightly more in comparison with being in a mounted state. This makes possible mounting and dismounting processes without great application of force, and risk of damage due to said processes is reduced.

The abutment against the earphone 1 causes the shell-like part 5 of the adapter 2 to undergo an elastic deformation. The shell-like part 5 is in this case dimensioned such that said deformation is by far predominantly a bending and not, for example, predominantly a strain loading, as is the case with prior-art adapters which consist of silicone-like material. Due to the configuration of the required elastic deformation of the shell-like part 5 as a bending, the direction in which the elastic deformation, specifically the bending-out, of the holding extensions 7 is realized is very precisely definable. It is thus easily able to be achieved that, when joining together adapter 2 and earphone 1, these two parts slide relative to one another into precisely one single, precisely defined, stable relative position and remain therein.

It is likewise thus easily able to be achieved that covering by any parts of the adapter 2 is under no circumstances realized for surface regions of the earphone 1 for which this is desirable. This can relate in particular to the sound-emission surface 3 and possibly provided sensor surfaces 4 and/or additional sound-emission openings, and also surface regions at or below which an antenna is situated.

The optionally provided support extension 6, possibly improving the holding action at the ear, may be formed and function as in the case of designs according to the prior art. It typically consists of soft elastic material with high friction with respect to human skin, such as for example silicone. When used as intended, it projects by way of its free end to a concave region of the auricle that is clearly spaced apart from the auditory channel.

Preferably, the shell-like part 5 and the support extension 6 consist of mutually different materials, wherein the material of the support extension 6 has a lower modulus of elasticity than the material of the shell-like part 5.

According to an advantageous further development, the shell-like part 5 has on its outer side a surface layer whose material has a lower modulus of elasticity than the material of the shell-like part 5 situated therebelow. It is furthermore preferable for the material of said surface layer to have a higher coefficient of friction with respect to human skin than the material of the shell-like part 5 situated therebelow.

According to an advantageous further development, the shell-like part 5 at least regionally has at its intended surface of contact with the earphone 1 a surface coating which is elastically softer and/or has a higher coefficient of friction with respect to the surface of the earphone 1 than the material of the shell-like part 5, which is covered by said coating.

According to an advantageous further development, the support extension 6 and an outer coating of the shell-like part 5 consist of a mutually identical material and support extension 6 and said coating are produced in a joint manufacturing process.

According to an advantageous further development, the material of the support extension 6 regionally extends on that side of the shell-like part 5 which is intended to come into abutment against the earphone 1, so that said material also comes into abutment directly against the earphone 1. For example, it is possible for this purpose for the shell-like part 5 to be provided with a passage opening and for the material of the support extension 6 to extend through said opening. In this case, the support extension 6 and the material extending on the inner side of the shell-like part 5 may be applied and shaped in a joint manufacturing step. This design allows the stability of the holding of the adapter 2 against the earphone 1 to be improved without the desired attachment and detachment thereby being made more difficult.

Preferably, at least one of the holding extensions 7 is longer than it is wide. It is further preferable for this to be the case for all the holding extensions 7. That is to say, the length of the (imaginary) boundary line between a holding extension 7 and the connecting region 8 is shorter than the distance of said boundary line from the free end of the holding extension. In comparison with less slender embodiments of holding extensions 7, the desired extent of the elastic deformability is thus easier to achieve because it is thus the case that, with equal elastic stress in the material, a greater deformation distance is able to be achieved.

Figure 4:
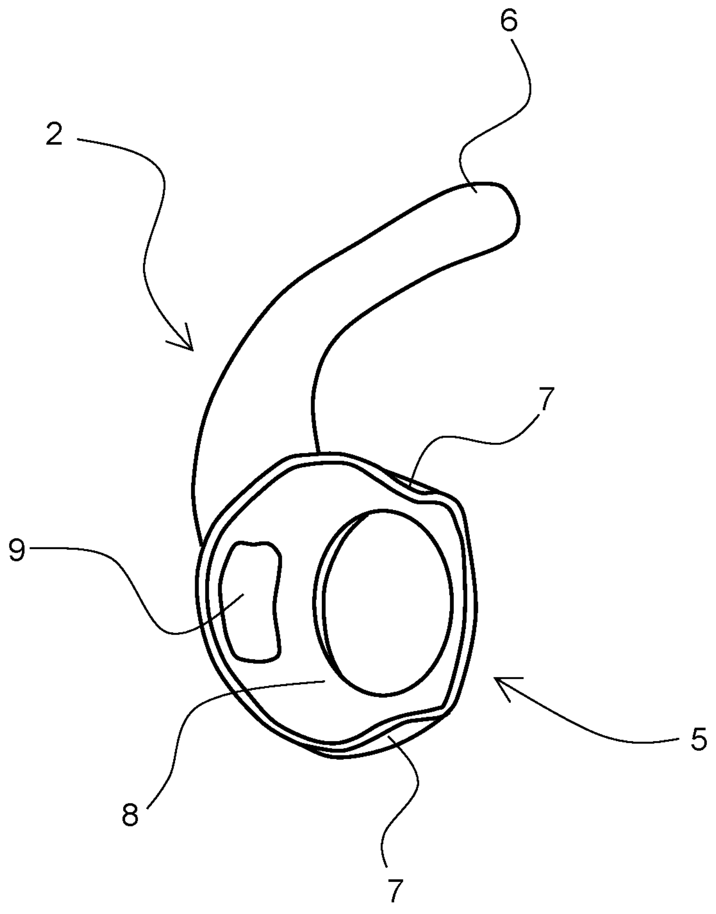
FIG. 4 shows an adapter according to the invention on its own for a fourth combination according to the invention.

In the exemplary embodiment as per FIG. 4, a permanent magnet 9 of areal shape is attached to the shell-like part 5 of the adapter 2. This is intended to interact with a ferromagnetic part or the magnetic field of a coil in the earphone 1 such that it is consequently possible for an additional—possibly even switchable—holding action between earphone 1 and adapter 2 to be achieved.

Figure 5:
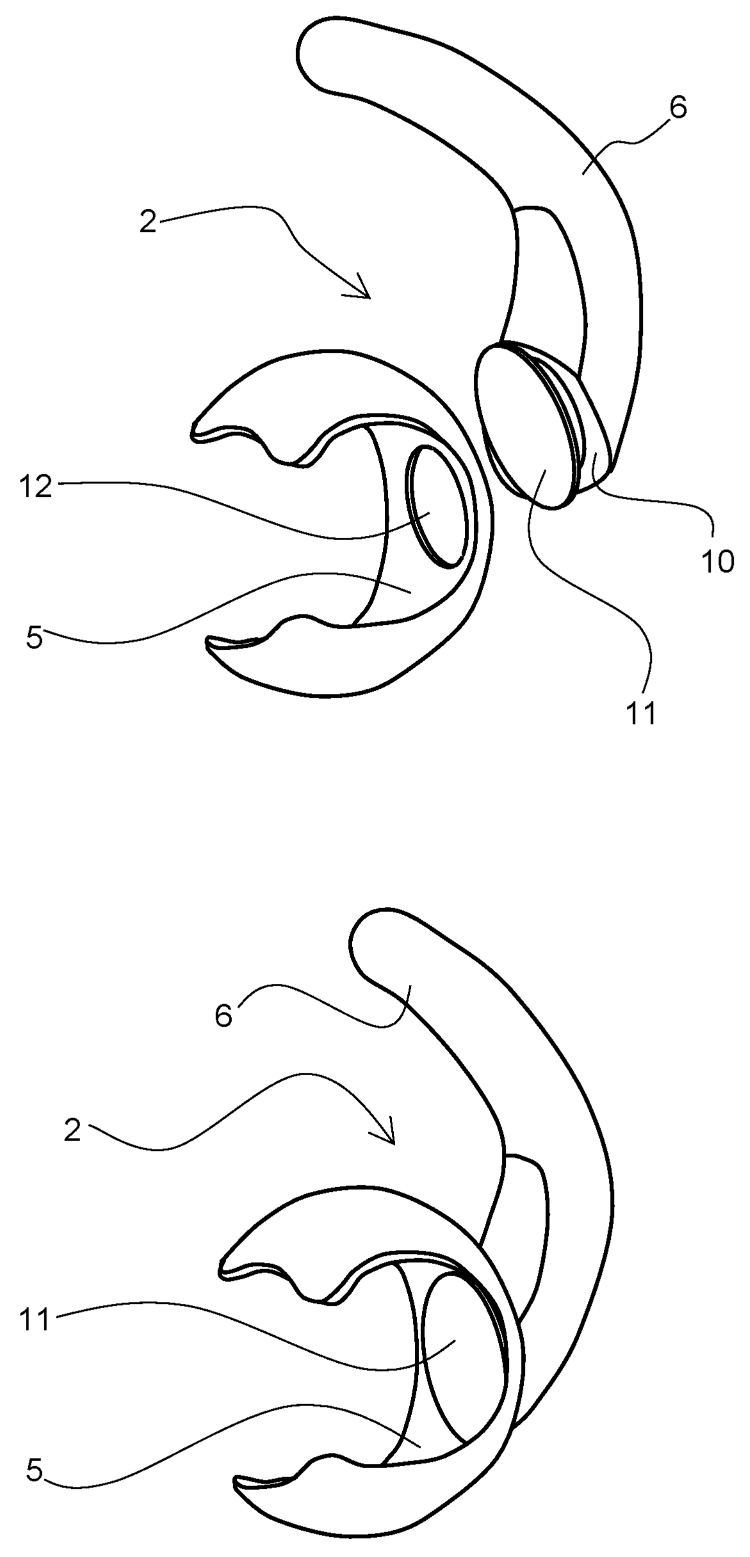
FIG. 5 shows a variant, formed from two individual parts detachably connectable to one another, of the adapter according to the invention in FIG. 1 in an exploded illustration (at the top) and in an assembled state (at the bottom).

In the exemplary embodiment of an adapter 2 according to the invention as per FIG. 5, the shell-like part 5 and the support extension 6 are detachably connectable to one another. In the illustrated example of the detachable connection, a connecting extension 11 of waisted form protrudes for this purpose from that surface 10 of the support extension 6 which, in the intended mounted state, abuts against the outer surface of the shell-like part 5, and the shell-like part 5 has an opening 12 in the surface region which is to make contact with the support extension 6. In a connected state, the connecting extension 11 projects from the outside into the volume embraced by the shell-like part 5 through the opening 12, and the lateral surface of the opening 12 abuts against the waisted region of the connecting extension 11.

The process of producing the connection between the shell-like part 5 and the support extension 6 may be realized in a number of ways, and details of the components to be connected may be defined so as to be optimized in a manner adapted thereto. Said details are able to be readily defined by persons skilled in this respect in the course of their routine specialized activities, and for this reason no further explanation will be given here. Without any claim to completeness, examples of connection variants shall be mentioned:

The free end region, widened in relation to the waisted region, of the connecting extension 11 is pushed through the opening 12 while simultaneously being deformed.

The support extension 6, with its free end region at the front, is, with the exception of the connecting extension 11, pulled through the opening 12, wherein it is temporarily deformed at the end region situated on the connecting extension 11.

The cross-sectional shape of the free end region of the connecting extension 11 is very different from the shape of a circle. The cross-sectional area of the opening 12 in the shell-like part 5 has for this purpose at least approximately the same shape and size. For connection, the free end region of the connecting extension 11 is pivoted relative to the shell-like part 5 in such an appropriate way that it can be easily plugged through the opening 12. It is plugged through the opening 12, and then pivoted parallel to its cross-sectional plane so that the longitudinal directions of the cross-sectional areas of connecting extension 11 and opening 12 are no longer parallel to one another; they are then preferably at a right angle to one another.

The lateral surface of the opening 12 is not closed in a ring-like manner but has an open side like the coastline of a bay, so that it constitutes an encircling formation which is open at one side. For the anchoring of the support extension 6 to the shell-like part 5, the waisted region of the connecting extension 11 is pushed into the opening 12 through the open side of the lateral surface of the opening 12, that is to say parallel to the area of the opening 12 and not normal thereto.

The fact that the support extension 6 and thus also the connecting extension 11 thereof are preferably formed from a soft elastic material, such as typically silicone, means that the connecting methods mentioned and also the easily conceivable methods complementary thereto for releasing the connection are easy to realize.

The design, discussed particularly on the basis of FIG. 5, with detachable connecting extension 6, in comparison with the previously discussed designs of adapters 2, yields the advantages that it is possible to select between support extensions 6 of mutually different design, and that the soft elastic material of the connecting extension 11, which preferably has a higher coefficient of friction in comparison with the material of the shell-like part 5, also abuts against the earphone 1 if adapter 2 and earphone 1—as shown in FIG. 1—are connected as intended. Due to the static friction between the material of the connecting extension 11 and the outer surface of the earphone 1, the static friction between the adapter 2 and the earphone 1 is improved. Due to this additional static friction, it is possible to make do with a lower elastic bending pretension of the holding extensions 7.

The invention claimed is:

1. An adapter to be detachably connected to an earphone, and serving to assist with fixing of the earphone to a human ear wherein the adapter has a support extension, when used as intended, extends between a vicinity of the earphone and a region of a concave side of an auricle, the region is spaced apart from an external auditory canal of the human ear, and/or the adapter has surface regions, when used as intended, abut against the human ear, a material has a higher coefficient of friction with respect to human skin than a surface material of the earphone, wherein the adapter has a shell which, in a mounted state, regionally embraces a surface of the earphone and thus holds the adapter in a form-fitting manner against any relative movement with respect to the earphone, wherein adapter and earphone abut against one another under mutual pressure at multiple contact-surface regions, wherein a pressure force is a consequence of elastic deformation of the adapter due to the abutment against the earphone, wherein no part of the adapter projects into a volume region outside the earphone from which connecting lines to a sound-emission surface of the earphone that extend in the air and rectilinearly and meet the sound-emission surface at a right angle are conceivable, wherein:

the shell of the adapter has at least two holding extensions and a connecting region which connects said holding extensions, wherein the holding extensions protrude from the connecting region in a manner of peninsulas and abut areally against the earphone, wherein the holding extensions and connecting region of the shell clasp the volume region of the earphone from different sides, and in a process are preloaded, predominantly by bending stress, elastically away from a center of the clasped volume region in relation to an orientation in an elastically relaxed state, wherein, during attachment and detachment of the adapter, the holding extensions, due to the abutment against the volume region to be clasped of the adapter, are temporarily bent elastically with greater intensity in a direction away from the center of the clasped volume region.

2. The adapter as claimed in claim 1, wherein the holding extensions abut directly against the earphone with more than 20% of a surface of the holding extensions facing toward the earphone.

3. The adapter as claimed in claim 2, wherein surfaces of contact between the holding extensions and the earphone are convexly domed.

4. The adapter as claimed in claim 1, wherein part shell and the support extension comprise of mutually different materials wherein the material of the support extension has a lower modulus of elasticity than the material of the shell.

5. The adapter as claimed in claim 1, wherein the shell has an outer side surface layer, a material of the outer side surface layer has a lower modulus of elasticity than the material of the shell situated therebelow.

6. The adapter as claimed in claim 1, wherein the shell has an outer side surface layer, the outer side surface layer has a coefficient of friction with respect to the human skin is higher than the material of the shell situated therebelow.

7. The adapter as claimed claim 1, wherein the shell at least regionally has a surface of contact with the earphone a surface coating whose material has a lower modulus of elasticity and/or, with respect to the surface of the earphone, a higher coefficient of friction than the material of the shell, which is covered by said surface coating.

8. The adapter as claimed in claim 1, wherein the adapter has the support extension, wherein the support extension and an outer coating of the shell comprise of a mutually identical material, and wherein the support extension and the outer coating of the shell are produced in a joint manufacturing process.

9. The adapter as claimed in claim 1, wherein at least one of the holding extensions is longer than it is wide.

10. The adapter as claimed in claim 1, wherein a permanent magnet is attached to the shell like part shell of the adapter.

11. The adapter as claimed in claim 1, wherein the adapter has the support extension which is detachably connectable to the shell, wherein, in a connected state, a connecting extension of waisted form of the support extension projects through an opening in the shell and a lateral surface of the opening abuts against a waisted region of the connecting extension.

12. A combination of the earphone and the adapter as claimed in claim 1 detachably connected thereto.

* * * * *